(12) United States Patent
Breitung et al.

(10) Patent No.: US 7,419,762 B2
(45) Date of Patent: *Sep. 2, 2008

(54) MEDIA AND METHOD FOR LIMITING ACCESS TO DATA THEREON

(75) Inventors: Eric Michael Breitung, Albany, NY (US); Eelco Michiel Sebastiaan van Hamersveld, Raamsdonksveer (NL); Daniel Robert Olson, Bend, OR (US); Marc Brian Wisnudel, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/986,611

(22) Filed: Nov. 12, 2004

(65) Prior Publication Data

US 2005/0129953 A1   Jun. 16, 2005

Related U.S. Application Data

(63) Continuation of application No. 10/762,712, filed on Jan. 21, 2004, now Pat. No. 6,991,889, which is a continuation of application No. 09/681,288, filed on Mar. 14, 2001, now Pat. No. 6,733,950.

(51) Int. Cl.
*G11B 7/24*   (2006.01)

(52) U.S. Cl. .................. 430/270.11; 430/945; 428/412; 428/64.8; 369/284

(58) Field of Classification Search ........................ None
See application file for complete search history.

(56) References Cited

U.S. PATENT DOCUMENTS

| | | | |
|---|---|---|---|
| 3,768,976 A | 10/1973 | Hu et al. | |
| 4,179,548 A | 12/1979 | Schroeter et al. | |
| 4,220,707 A | 9/1980 | Ohmura et al. | |
| 4,332,880 A | 6/1982 | Izu et al. | |
| 4,404,257 A | 9/1983 | Olson | |
| 4,491,508 A | 1/1985 | Olson et al. | |
| 4,523,208 A | 6/1985 | Barzynski | |
| 4,767,693 A * | 8/1988 | Oba et al. | 430/270.19 |
| 4,807,220 A * | 2/1989 | Miyai et al. | 369/286 |
| 4,983,505 A * | 1/1991 | Higuchi et al. | 430/270.11 |
| 4,997,903 A | 3/1991 | Okamoto | |

(Continued)

FOREIGN PATENT DOCUMENTS

EP    274092    7/1988

(Continued)

OTHER PUBLICATIONS

Larson et al., "Properties of radiation cured coatings", Intern. J. Rad Appl. Instrum. Part C, Rad. Phys & Chem. vol. 30(1) pp. 11-15.*

(Continued)

*Primary Examiner*—Martin J Angebranndt
(74) *Attorney, Agent, or Firm*—Scott J. Asmus

(57) ABSTRACT

A media can comprise: a reflective layer, an oxygen penetrable UV coating, and a reactive layer disposed between the UV coating and the reflective layer. The reactive layer can comprise a reactive material that oxidizes with exposure to oxygen.

23 Claims, 2 Drawing Sheets

U.S. PATENT DOCUMENTS

| | | | | |
|---|---|---|---|---|
| 5,135,791 | A * | 8/1992 | Imai et al. | 428/64.4 |
| 5,276,673 | A * | 1/1994 | Kobayashi et al. | 369/275.3 |
| 5,368,988 | A | 11/1994 | Shinkai et al. | |
| 5,633,060 | A * | 5/1997 | Tokuda et al. | 428/64.1 |
| 5,753,413 | A | 5/1998 | Nishida et al. | |
| 5,815,484 | A * | 9/1998 | Smith et al. | 369/275.1 |
| 6,011,772 | A | 1/2000 | Rollhaus et al. | |
| 6,156,580 | A * | 12/2000 | Wooten et al. | 438/16 |
| 6,165,580 | A * | 12/2000 | Yamazaki et al. | 428/64.1 |
| 6,168,844 | B1 | 1/2001 | Takagishi et al. | |
| 6,169,572 | B1 * | 1/2001 | Sogawa | 348/113 |
| 6,228,440 | B1 | 5/2001 | Dailey et al. | |
| 6,228,933 | B1 * | 5/2001 | Hiles | 524/590 |
| 6,246,656 | B1 * | 6/2001 | Kawakubo et al. | 369/112.23 |
| 6,338,933 | B1 | 1/2002 | Lawandy et al. | |
| 6,434,109 | B2 * | 8/2002 | Rollhaus et al. | 369/286 |
| 6,589,626 | B2 * | 7/2003 | Selinfreund et al. | 428/64.1 |
| 6,733,950 | B2 * | 5/2004 | Breitung et al. | 430/270.11 |
| 6,756,103 | B2 * | 6/2004 | Thompson et al. | 428/64.1 |
| 6,866,909 | B2 * | 3/2005 | Wisnudel et al. | 428/64.1 |
| 6,991,889 | B2 * | 1/2006 | Breitung et al. | 430/270.1 |
| 2002/0102499 | A1 * | 8/2002 | Krieg-Kowald | 430/321 |
| 2003/0198892 | A1 * | 10/2003 | Ezbiansky et al. | 430/270.14 |
| 2003/0205323 | A1 * | 11/2003 | Ezbiansky et al. | 156/310 |
| 2003/0207206 | A1 * | 11/2003 | Olson et al. | 430/270.14 |
| 2004/0014859 | A1 * | 1/2004 | Ezbiansky et al. | 524/379 |
| 2004/0022986 | A1 * | 2/2004 | van de Grampel et al. | 428/64.4 |
| 2004/0152014 | A1 * | 8/2004 | Breitung et al. | 430/270.11 |
| 2006/0002285 | A1 * | 1/2006 | Olson et al. | 369/288 |

FOREIGN PATENT DOCUMENTS

| | | | |
|---|---|---|---|
| EP | 0455585 A1 | | 11/1991 |
| JP | 55-030605 | | 3/1980 |
| JP | 57-212634 | * | 12/1982 |
| JP | 58-224448 | * | 12/1983 |
| JP | 59-124891 | * | 7/1984 |
| JP | 59-151346 | * | 8/1984 |
| JP | 60-093983 | | 5/1985 |
| JP | 60-127542 | * | 7/1985 |
| JP | 60-213938 | | 10/1985 |
| JP | 60-256944 | * | 12/1985 |
| JP | 60-261046 | * | 12/1985 |
| JP | 61-063489 | * | 4/1986 |
| JP | 61-260435 | * | 11/1986 |
| JP | 63-218398 | * | 9/1988 |
| JP | 02-018728 | * | 1/1990 |
| JP | 02-037539 | * | 2/1990 |
| JP | 04-238086 | * | 8/1992 |
| JP | 05-273691 | * | 10/1993 |
| JP | 09-237437 | * | 9/1997 |
| WO | WO 98/11539 | | 3/1998 |

OTHER PUBLICATIONS

Sax et al., "Permeabilities of radiation cured marterials", Intern. J. Rad Appl. Instrum. Part C, Rad. Phys & Chem. vol. 31(4-6) pp. 887-896.*

Larson et al., "Properties of radiation cured coatings", Intern. J. Rad Appl. Instrum. Part C, Rad. Phys & Chem. vol. 30(1) pp. 11-15 (1988).*

Sax et al., "Permeabilities of radiation cured marterials", Intern. J. Rad Appl. Instrum. Part C, Rad. Phys & Chem. vol. 31(4-6) pp. 887-896 (1988).*

Translation of JP 60-256944.*

Translation of JP 60-261046.*

English Translation of JP 60-127542.*

"Overview Polycarbonate, Optical Grade" MATWEB.COM, The Online Materials Database, Online! XP002208336, 3 pages.

International Search Report, International Application No. PCT/US02/05050, International Filing Date: Feb. 6, 2002, 8 pages.

"FlexPlay Coating Recipe", Richard a. Minns, Aprilis, Inc., Jun. 28, 2000, pp. 1-3.

English Translation of JP 60-213938.

Identifying Top Quality CD and DVD Media for Archiving; NIST Tech Beat; Dec. 8, 2004; http://www.itl.nist.gov/public_affairs/techbeat/tb2004_1208.htm; pp. 1-5.

Slattery, Oliver, et al.; Stability Comparison of Recordable Optical Discs—A Study of Error Rates in Harsh Conditions; Journal of Research of the National Institute of Standards and Technology; vol. 109, No. 5, Sep.-Oct. 2004; pp. 517-524.

* cited by examiner

MEDIA AND METHOD FOR LIMITING ACCESS TO DATA THEREON

CROSS REFERENCE TO RELATED APPLICATIONS

This application is a continuation in part of application Ser. No. 10/762,712, filed Jan. 21, 2004, now U.S. Pat. No. 6,991,889, which is a continuation of application Ser. No. 09/681,288, filed Mar. 14, 2001, now U.S. Pat. No. 6,733,950.

BACKGROUND OF THE INVENTION

Optical, magnetic and magneto-optic media are primary sources of high performance storage technology which enables high storage capacity coupled with a reasonable price per megabyte of storage. Use of optical media has become widespread in audio, video, and computer data applications in such formats as compact disk (CD), digital versatile disk (DVD) including multi-layer structures like DVD-5, DVD-9, and multi-sided formats such as DVD-10, and DVD-18, magneto-optical disk (MO), and other write-once and re-writable formats such as CD-R, CD-RW, DVD-R, DVD-RW, DVD+RW, DVD-RAM, and the like, hereinafter collectively "data storage media". In these formats, data are encoded onto a substrate into a digital data series. In pre-recorded media, such as CD, the data are typically pits and grooves formed on the surface of a plastic substrate through a method such as injection molding, stamping or the like.

In recordable media, the data are encoded by laser, which illuminates an active data layer that undergoes a phase change, thus producing a series of highly-reflecting or non-reflective regions making up the data stream. In these formats, a laser beam first travels through a plastic substrate before reaching the data layer. At the data layer, the beam is either reflected or not, in accordance with the encoded data. The laser light then travels back through the plastic and into an optical detector system where the data are interpreted.

In some applications, it is desirable to have a limited life for an optical disc. For example, sample computer programs are provided to potential customers in order to entice them to purchase the software. The programs are intended to be used for a limited period of time. Additionally, music and movies are currently rented for a limited time period. In each of these applications and others, when that time has expired, the disc must be returned. A need exists for machine-readable optical discs that do not need to be returned at the end of a rental period. Limited-play discs provide a solution to this problem.

Limited play discs have been produced in various fashions. One method comprised forming a disc where the reflective layer is protected with a porous layer such that the reflective layer becomes oxidized over a pre-determined period of time. Once the reflective layer attains a certain level of oxidation, the disc is no longer readable. The problem with this and other limited play techniques is that these techniques are defeatable.

If the method for providing limited play to optical discs can be easily defeated by a customer or a cottage industry, discs would no longer be "limited-play". In the case of a coating or material rendering an optical disc unplayable, for example, facile removal or modification of that coating and/or material could provide a disc with unlimited playability.

There is a great desire on the part of movie studios to protect their intellectual property. Commercialization of limited-play data storage media that can be easily defeated to afford data storage media with unlimited playability would present an unacceptable risk of losing intellectual property.

BRIEF SUMMARY OF THE INVENTION

The present disclosure relates to media. In one embodiment, the media can comprise: a substrate, reflective layer, an oxygen penetrable UV coating, and a reactive layer disposed between the UV coating and the reflective layer. The reactive layer can comprise a reactive material that oxidizes with exposure to oxygen.

In another embodiment, the media can comprise: a substrate, a reflective layer, an oxygen penetrable UV coating, and a reactive layer disposed between said UV coating and said reflective layer. The UV coating can comprise a material selected from the group consisting of a silicon hardcoat, an acrylate, and reaction products and combinations comprising at least one of the foregoing materials.

The above described and other features are exemplified by the following figures and detailed description.

BRIEF DESCRIPTION OF THE DRAWINGS

Referring now to the figures, which are meant to be illustrative, not limiting.

DETAILED DESCRIPTION OF THE INVENTION

The method for making limited-play data storage media comprises forming a substrate with a reactive layer and a UV coating. Upon exposure to oxygen, a reactive material, e.g., leuco methylene blue, which is essentially colorless, is oxidized to form an opaque or semi-opaque layer (e.g., the deep blue dye, methylene blue). Data storage media with the opaque/semi-opaque layer can no longer be played in media players. By adjusting the time it takes to turn opaque, this method can be used to provide limited-play data storage media having the desired life for the given application. However, it has been found that limited-play discs prepared solely with the reactive material layer, in this manner, are easily "defeated", e.g., in a bleach test, so that they are no longer "limited-play". The additional use of an ultra violet (UV) curable topcoat to discs with a reactive layer affords limited-play data storage media that cannot be defeated in the bleach test.

Figure 1:
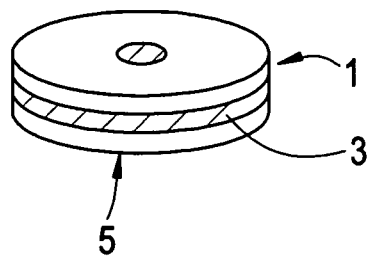
FIG. 1 is and isometric view of a data storage media.

The data storage media comprises a substrate 5 having low birefringence and high light transmittance at the read laser wavelength, i.e., is readable in an optical media device, a reactive material reactive layer 3, a UV coating 1, a data storage layer 9, and a reflective layer 7. (See FIGS. 1 and 2) The substrate 5 can comprise material having sufficient optical clarity, e.g., a birefringence of about ±100 nm or less, to render the data storage material readable in a media device. Generally, polycarbonates are employed. In theory, any plastic that exhibits these properties can be employed as the substrate. However, the plastic should be capable of withstanding the subsequent processing parameters (e.g., application of subsequent layers) such as sputtering temperatures of about room temperature (about 25° C.) up to about 150° C., and subsequent storage conditions (e.g., in a hot car having temperatures up to about 70° C.). That is, it is desirable for the plastic to have sufficient thermal stability to prevent deformation during the various layer deposition steps as well as during storage by the end-user. Possible plastics include thermoplastics with glass transition temperatures of about 100° C. or greater, with about 125° C. or greater preferred, about 150° C. or greater more preferred, and about 200° C. or greater even more preferred (e.g., polyetherimides, polyetheretherketones, polysulfones, polyethersulfones, polyetherethersulfones, polyphenylene ethers, polyimides, polycarbonates, etc.); with materials having glass transition temperatures greater than about 250° C. more preferred, such as polyetherimide in which sulfonedianiline or oxydianiline has been substituted for m-phenylenediamine, among others, as well as polyimides, combinations comprising at least one of the foregoing plastics, and others.

Some possible examples of substrate materials include, but are not limited to, amorphous, crystalline, and semi-crystalline thermoplastic materials such as: polyvinyl chloride, polyolefins (including, but not limited to, linear and cyclic polyolefins and including polyethylene, chlorinated polyethylene, polypropylene, and the like), polyesters (including, but not limited to, polyethylene terephthalate, polybutylene terephthalate, polycyclohexylmethylene terephthalate, and the like), polyamides, polysulfones (including, but not limited to, hydrogenated polysulfones, and the like), polyimides, polyether imides, polyether sulfones, polyphenylene sulfides, polyether ketones, polyether ether ketones, ABS resins, polystyrenes (including, but not limited to, hydrogenated polystyrenes, syndiotactic and atactic polystyrenes, polycyclohexyl ethylene, styrene-co-acrylonitrile, styrene-co-maleic anhydride, and the like), polybutadiene, polyacrylates (including, but not limited to, polymethylmethacrylate (PMMA), methyl methacrylate-polyimide copolymers, and the like), polyacrylonitrile, polyacetals, polycarbonates, polyphenylene ethers (including, but not limited to, those derived from 2,6-dimethylphenol and copolymers with 2,3,6-trimethylphenol, and the like), ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, tetrafluoroethylenes (e.g., Teflons)

As used herein, the terms "polycarbonate", "polycarbonate composition", and "composition comprising aromatic carbonate chain units" includes compositions having structural units of the formula (I):

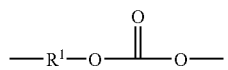

(I)

in which at least about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula (II):

(II)

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative, non-limiting examples of radicals of this type are —O—, —S—, —S(O)—, —S(O$_2$)—, —C(O)—, methylene, cyclohexylmethylene, 2-[2,2,1]-bicycloheptylidene, ethylidene, isopropylidene, neopentylidene, cyclohexylidene, cyclopentadecylidene, cyclododecylidene, adamantylidene, and the like. In another embodiment, zero atoms separate $A^1$ from $A^2$, with an illustrative example being biphenol (OH-benzene-benzene-OH). The bridging radical $Y^1$ can be a hydrocarbon group or a saturated hydrocarbon group such as methylene, cyclohexylidene or isopropylidene.

Polycarbonates can be produced by the reaction of dihydroxy compounds in which only one atom separates $A^1$ and $A^2$. As used herein, the term "dihydroxy compound" includes, for example, bisphenol compounds having general formula (III) as follows:

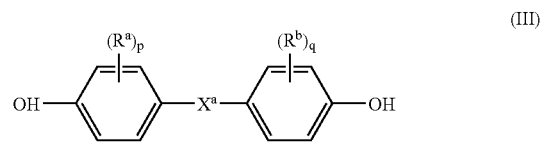

(III)

wherein $R^a$ and $R^b$ each independently represent hydrogen, a halogen atom, or a monovalent hydrocarbon group; p and q are each independently integers from 0 to 4; and $X^a$ represents one of the groups of formula (IV):

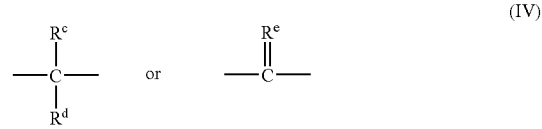

(IV)

wherein $R^c$ and $R^d$ each independently represent a hydrogen atom or a monovalent linear or cyclic hydrocarbon group, and $R^e$ is a divalent hydrocarbon group.

Some illustrative, non-limiting examples of suitable dihydroxy compounds include dihydric phenols and the dihydroxy-substituted aromatic hydrocarbons such as those disclosed by name or formula (generic or specific) in U.S. Pat. No. 4,217,438,. A nonexclusive list of specific examples of the types of bisphenol compounds that may be represented by formula (III) includes the following: 1,1-bis(4-hydroxyphenyl)methane; 1,1-bis(4-hydroxyphenyl)ethane; 2,2-bis(4-hydroxyphenyl)propane (hereinafter "bisphenol A" or "BPA"); 2,2-bis(4-hydroxyphenyl)butane; 2,2-bis(4-hydroxyphenyl) octane; 1,1-bis(4-hydroxyphenyl)propane; 1,1-bis(4-hydroxyphenyl)n-butane; bis(4-hydroxyphenyl)phenylmethane; 2,2-bis(4-hydroxy-1-methylphenyl)propane; 1,1-bis(4-hydroxy-t-butylphenyl)propane; bis(hydroxyaryl) alkanes such as 2,2-bis(4-hydroxy-3-bromophenyl)propane; 1,1-bis(4-hydroxyphenyl)cyclopentane; 4,4'-biphenol; and bis(hydroxyaryl)cycloalkanes such as 1,1-bis(4-hydroxyphenyl)cyclohexane; and the like as well as combinations comprising at least one of the foregoing bisphenol compound.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have about 2 to about 40 carbons. A preferred aliphatic diacid is dodecandioic acid.

Polyarylates and polyester-carbonate resins or their blends can also be employed. Branched polycarbonates are also useful, as well as blends of linear polycarbonate and a branched polycarbonate. The branched polycarbonates may be prepared by adding a branching agent during polymerization.

These branching agents are well known and may comprise polyfunctional organic compounds containing at least three functional groups which may be hydroxyl, carboxyl, carboxylic anhydride, haloformyl, and mixtures comprising at least one of the foregoing branching agents. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl) α,α-dimethyl benzyl)phenol), 4-chloroformyl phthalic anhydride, trimesic acid, benzophenone tetracarboxylic acid, and the like, as well as combinations comprising at least one of the foregoing branching agents. The branching agents may be added at a level of about 0.05 to about 2.0 weight percent, based upon the total weight of the substrate. Examples of branching agents and procedures for making branched polycarbonates are described in U.S. Pat. Nos. 3,635,895 and 4,001,184. All types of polycarbonate end groups are herein contemplated.

Preferred polycarbonates are based on bisphenol A, in which each of $A^1$ and $A^2$ is p-phenylene and $Y^1$ is isopropylidene. Preferably, the weight average molecular weight of the polycarbonate is about 5,000 to about 100,000 atomic mass units, more preferably about 10,000 to about 65,000 atomic mass units, and most preferably about 15,000 to about 35,000 atomic mass units.

In monitoring and evaluating polycarbonate synthesis, it is of particular interest to determine the concentration of Fries product present in the polycarbonate. As noted, the generation of significant Fries product can lead to polymer branching, resulting in uncontrollable melt behavior. As used herein, the terms "Fries" and "Fries product" denote a repeating unit in polycarbonate having the formula (V):

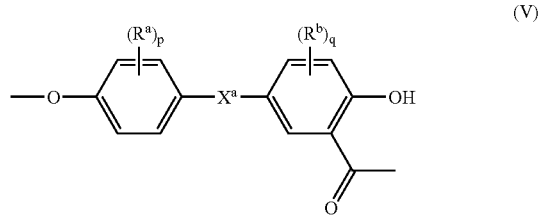

(V)

wherein $X^a$ is a bivalent radical as described in connection with Formula (III) supra.

The polycarbonate composition may also include various additives ordinarily incorporated in resin compositions of this type. Such additives are, for example, fillers or reinforcing agents; heat stabilizers; antioxidants; light stabilizers; plasticizers; antistatic agents; mold releasing agents; additional resins; blowing agents; and the like, as well as combinations comprising at least one of the foregoing additives.

In order to aid in the processing of the substrate material (e.g., the production of polycarbonate via a melt process) or to control a property of the substrate material (e.g., viscosity). catalyst(s) may also be employed. Possible catalysts include tetraalkylammonium hydroxide, tetraalkylphosphonium hydroxide, and the like, with diethyldimethylammonium hydroxide, and tetrabutylphosphonium hydroxide preferred. The catalyst(s) can be employed alone or in combination with quenchers such as acids, e.g., as phosphoric acid, and the like. Additionally, water may be injected into the polymer melt during compounding and removed as water vapor through a vent to remove residual volatile compounds.

Data storage media can be produced by first forming the substrate material using a conventional reaction vessel capable of adequately mixing various precursors, such as a single or twin screw extruder, kneader, blender, or the like. The extruder should be maintained at a sufficiently high temperature to melt the substrate material precursors without causing decomposition thereof. For polycarbonate, for example, temperatures of about 220° C. to about 360° C. can be used, with about 260° C. to about 320° C. preferred. Similarly, the residence time in the extruder should be controlled to minimize decomposition. Residence times of up to about 2 minutes (min) or more can be employed, with up to about 1.5 min preferred, and up to about 1 min especially preferred. Prior to extrusion into the desired form (typically pellets, sheet, web, or the like), the mixture can optionally be filtered, such as by melt filtering and/or the use of a screen pack, or the like, to remove undesirable contaminants or decomposition products.

Once the plastic composition has been produced, it can be formed into the substrate using various molding and/or processing techniques. Possible techniques include injection molding, film casting, extrusion, press molding, blow molding, stamping, and the like. Once the substrate has been produced, additional processing, such as electroplating, coating techniques (spin coating, spray coating, vapor deposition, screen printing, painting, dipping, and the like), lamination, sputtering, and the like, as well as combinations comprising at least one of the foregoing processing techniques, may be employed to dispose desired layers on the substrate.

An example of a limited play polycarbonate data storage media comprises an injection molded polycarbonate substrate. Disposed on the substrate are various layers including: a data layer, dielectric layer(s), a reactive layer(s), a UV layer(s), a reflective layer(s), and/or a protective layer, as well as combinations comprising at least one of the foregoing layers. For an optical media, the layers may be protective layer, reflective layer, dielectric layer, and data storage layer, with a subsequent dielectric layer in contact with the substrate and the UV layer disposed on the opposite side of the substrate, with the reactive layer disposed between the substrate and the UV layer. It is understood that the form of the data storage media is not limited to disc shape, but may be any size and shape which can be accommodated in a readout device.

The data storage layer(s) may comprise any material capable of storing retrievable data, such as an optical layer, magnetic layer, or a magneto-optic layer. Typically the data layer has a thickness of up to about 600 Angstroms (Å) or so, with a thickness up to about 300 Å preferred. Possible data storage layers include, but are not limited to, oxides (such as silicone oxide), rare earth element—transition metal alloy, nickel, cobalt, chromium, tantalum, platinum, terbium, gadolinium, iron, boron, others, and alloys and combinations comprising at least one of the foregoing, organic dye (e.g., cyanine or phthalocyanine type dyes), and inorganic phase change compounds (e.g., TeSeSn, InAgSb, and the like).

The protective layer(s), which protect against dust, oils, and other contaminants, can have a thickness of greater than about 100 microns (μ) to less than about 10 Å, with a thickness of about 300 Å or less preferred in some embodiments, and a thickness of about 100 Å or less especially preferred. The thickness of the protective layer(s) is usually determined, at least in part, by the type of read/write mechanism employed, e.g., magnetic, optic, or magneto-optic. Possible protective layers include anti-corrosive materials such as gold, silver, nitrides (e.g., silicon nitrides and aluminum nitrides, among others), carbides (e.g., silicon carbide and others), oxides (e.g., silicon dioxide and others), polymeric materials (e.g., polyacrylates or polycarbonates), carbon film (diamond, diamond-like carbon, and the like), among others, and combinations comprising at least one of the foregoing materials.

The dielectric layer(s), which are disposed on one or both sides of the data storage layer and are often employed as heat controllers, can typically have a thickness of up to or exceeding about 1,000 Å and as low as about 200 Å or less. Possible dielectric layers include nitrides (e.g., silicon nitride, aluminum nitride, and others); oxides (e.g., aluminum oxide); carbides (e.g., silicon carbide); and combinations comprising at least one of the foregoing materials, among other materials compatible within the environment and preferably not reactive with the surrounding layers.

The reflective layer(s) should have a sufficient thickness to reflect a sufficient amount of energy (e.g., light) to enable data retrieval. Typically the reflective layer(s) can have a thickness of up to about 700 Å or so, with a thickness of about 300 Å to about 600 Å generally preferred. Possible reflective layers include any material capable of reflecting the particular energy field, including metals (e.g., aluminum, silver, gold, titanium, and alloys and mixtures comprising at least one of the foregoing metals, and others).

The reactive layer, which comprises both a carrier and a reactive material, should initially have sufficient transmission to enable data retrieval by the data storage media device, and subsequently form a layer which inhibits data retrieval by that device (e.g., which absorbs a sufficient amount of light i.e., incident and/or reflected light) at the wavelength of the laser in the given device). Typically a layer that allows an initial percent reflectivity from the reflective layer of about 50% or greater can be employed, with an initial percent reflectivity of about 65% or greater preferred, and an initial percent reflection of about 75% or greater more preferred. Once the media has been exposed to oxygen, e.g., air, for a desired period of time (e.g., the desired allowable play time of the media), the layer preferably comprises a percent reflectivity of about 45% or less, with about 30% or less preferred, about 20% or less more preferred, and about 15% or less especially preferred.

Possible reactive materials include oxygen sensitive leuco or reduced forms of methylene blue, brilliant cresyl blue, basic blue 3, and toluidine 0, as well as reaction products and combinations comprising at least one of the foregoing material; the structures of which are set forth as formulas VI-IX below:

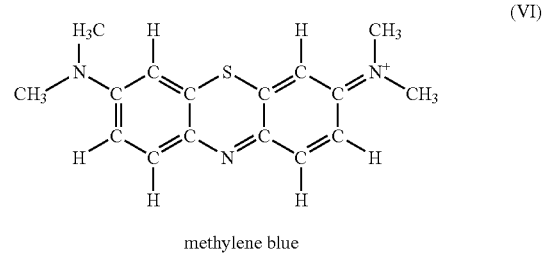

methylene blue (VI)

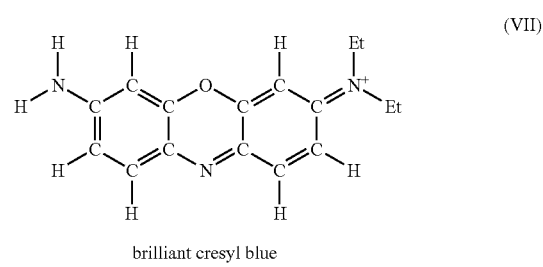

brilliant cresyl blue (VII)

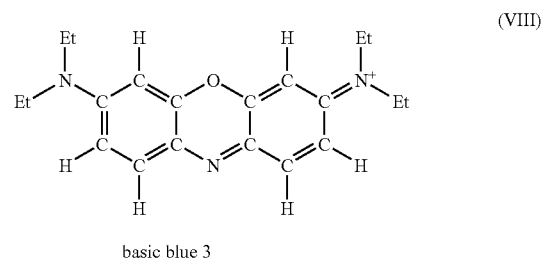

basic blue 3 (VIII)

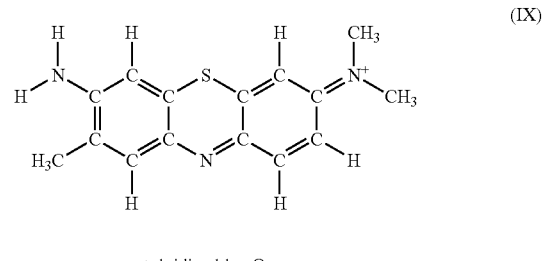

toluidine blue O (IX)

Another possible reactive material comprises a dye which re-oxidizes over approximately 48 hours without a UV coating. The synthesis and oxidation of this dye is shown below:

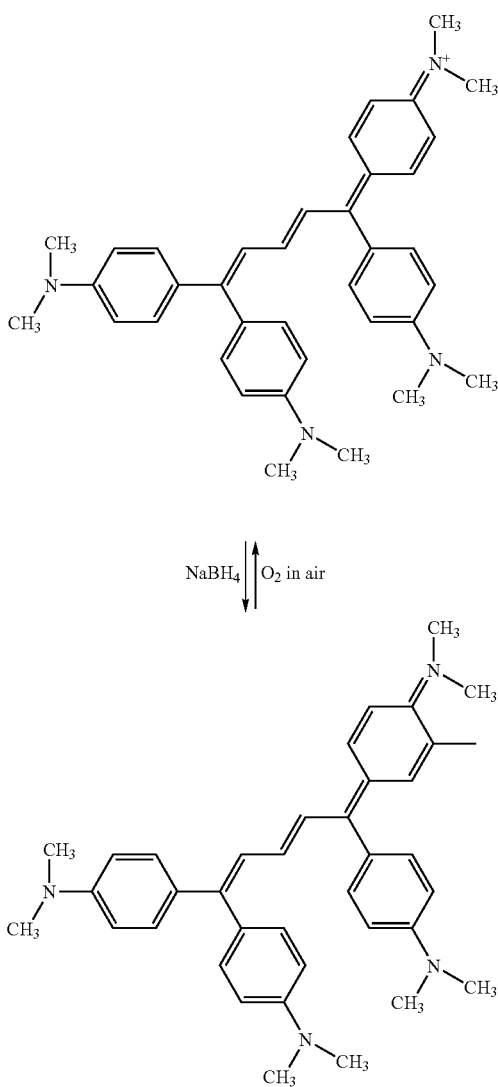

The method of synthesis and the oxygen dependent reoxidation to form the colored form of the methylene blue dye is shown below:

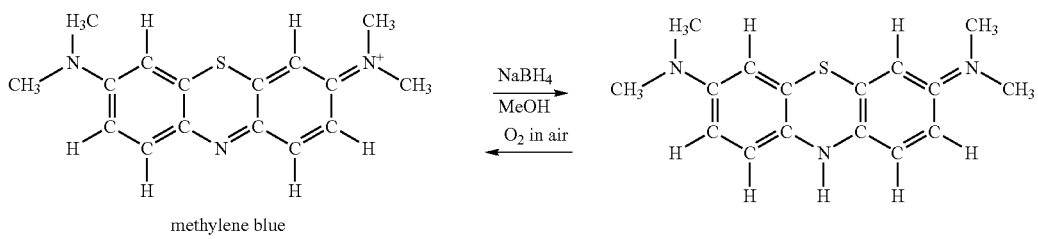

methylene blue

In addition to the above reactive materials, numerous other dyes and light blocking materials, can be synthesized to operate to render the data storage media limited play. For example, some other possible reactive materials can be found in U.S. Pat. No. 4,404,257 and U.S. Pat. No. 5,815,484. The reactive materials can further comprise a mixture comprising at least one of any of the abovementioned reactive materials.

The amount of reactive material in the reactive layer is dependent upon the desired life of the data storage media in combination with the oxygen permeability of the UV coating. For a life of up to about 3 days, with a 2μ to about 30μ thick UV coating, the amount of reactive material in the reactive layer can be as little as about 0.1 weight percent (wt %), with about 3 wt % preferred, and about 4 wt % more preferred, based upon the total weight of the reactive layer; with an upper amount of reactive material being about 10 wt %, with about 7 wt % preferred, about 6 wt % more preferred, and about 5 wt % even more preferred.

The reactive material is preferably mixed with a carrier for deposition on and/or impregnation into at least a portion of the surface of the substrate. Possible carriers comprise the thermoplastic acrylic polymers, polyester resins, epoxy resins, polythiolenes, UV curable organic resins, polyurethanes, thermosettable acrylic polymers, alkyds, vinyl resins and the like, as well as combinations comprising at least one of the foregoing carriers. Polyesters include, for example the reaction products of aliphatic dicarboxylic acids including, e.g., fumaric or maleic acid with glycols, such as ethyleneglycol, propyleneglycol, neopentylglycol, and the like, as well as reaction products and mixtures comprising at least one of the foregoing.

Some epoxy resins, which can be the used as the organic resin, include monomeric, dimeric, oligomeric, or polymeric epoxy material containing one or a plurality of epoxy functional groups. For example, reaction products of bis phenol-A and epichlorohydrin, or the epichlorohydrin with phenol-formaldehyde resins, and the like. Other organic resins can be in the form of mixtures of polyolefin and polythiols, such as shown by Kehr et al, U.S. Pat. Nos. 3,697,395 and 3,697,402.

Exemplary thermoplastic acrylic polymers are set forth, for example, in Encyclopedia of Polymer Science and Technology, Vol. 1, Interscience Publishers, John Wiley & Sons, Inc., 1964, at pp. 246 et seq. and the references cited therein, and the like, as well as combinations comprising at least one of the foregoing polymers.

The term thermoplastic acrylic polymers, as used herein, is meant to embrace within its scope those thermoplastic polymers resulting from the polymerization of one or more acrylic acid ester monomers, as well as methacrylic acid ester monomers. These monomers are represented by the general formula X:

$$CH_2=CYCOOR_5 \qquad (X)$$

wherein Y is hydrogen or a methyl radical and $R_5$ is an alkyl radical, preferably an alkyl radical comprising 1 to about 20 carbon atoms. Some nonlimiting examples of alkyl groups represented by $R_5$ include methyl, ethyl, n-propyl, isopropyl, n-butyl, isobutyl, sec-butyl, tert-butyl, pentyl, isopentyl, hexyl, and the like.

Some nonlimiting examples of acrylic acid ester monomers represented by formula X include: methyl acrylate, isopropyl acrylate, n-propyl acrylate, n-butyl acrylate, isobutyl acrylate, 2-ethylhexyl acrylate, and the like. Some nonlimiting examples of methacrylic acid ester monomers represented by formula X include: methyl methacrylate, ethyl methacrylate, butyl methacrylate, hexyl methacrylate, isobutyl methacrylate, propyl methacrylate, and the like, as well as reaction products and combinations comprising at least one of the foregoing; with poly(methyl methacrylate) (PMMA) preferred.

Copolymers of the above acrylate and methacrylate monomers are also included within the term thermoplastic acrylic polymers as it appears herein. The polymerization of the monomeric acrylic acid esters and methacrylic acid esters to provide the thermoplastic acrylic polymers may be accomplished by any of the known polymerization techniques. The thermoplastic acrylic polymers having a weight average molecular weight of about 30,000 g/mol or greater are generally preferred.

In order to enhance adhesion of the reactive layer to the substrate, a primer may be employed therebetween. The thermoplastic acrylic polymers useful as primers include: acrylic homopolymers derived from a single type of acrylic acid ester monomer; methacrylic homopolymers derived from a single type of methacrylic acid ester monomer; copolymers derived from two or more different acrylic acid ester monomers, two or more different methacrylic acid ester monomers, or an acrylic acid ester monomer and a methacrylic acid ester monomer; and the like, as well as combinations comprising at least one of the foregoing primers.

Mixtures of two or more of the aforedescribed thermoplastic acrylic polymers, e.g., two or more different acrylic homopolymers, two or more different acrylic copolymers, two or more different methacrylic homopolymers, two or more different methacrylic copolymers, an acrylic homopolymer and a methacrylic homopolymer, an acrylic copolymer and a methacrylic copolymer, an acrylic homopolymer and a methacrylic copolymer, and an acrylic copolymer and a methacrylic homopolymer, and reaction products thereof, can also be used.

Optionally, the reactive layer can be applied to the substrate using various coating techniques such as painting, dipping, spraying, spin coating, screen printing, and the like. For example, the reactive layer can be mixed with a relatively volatile solvent, preferably an organic solvent, which is substantially inert towards the polycarbonate, i.e., will not attack and adversely affect the polycarbonate, but which is capable of dissolving the carrier. Generally the concentration of the carrier in the solvent is about 0.5 weight percent (wt %) or greater, with about 1 wt % or greater preferred, while the upper range of the polymer is about 25 wt %, with about 15 wt % preferred. Examples of some suitable organic solvents include ethylene glycol diacetate, butoxyethanol, the lower alkanols, and the like.

The reactive layer may also optionally contain various additives such as flatting agents, surface active agents, thixotropic agents, and the like, and reaction products and combinations comprising at least one of the foregoing additives.

The thickness of the reactive layer is dependent upon the particular reactive material employed, the concentration thereof in the reactive layer, and the desired absorption characteristics of the layer both initially and after a desired period of time. The reactive layer can have a thickness as low as about 0.1 microns (µ), with about 0.5 µ preferred, and about 0.75 µ more preferred. On the upper end, the thickness can be up to about 50 µ or greater, with up to about 25 µ preferred, and up to about 15 µ more preferred. For example, in order to attain an initial percent reflectivity through the reactive layer of about 50% or greater and a percent reflectivity of about 30% or less after 24 hours, the layer preferably has a thickness of about 1 µ to about 25 µ, with about 1.5 µ to about 10 µ microns more preferred.

The protective coating, which is dispersed on or impregnated into at least a portion of the reactive layer, can comprise any UV curable material which is capable of forming a layer penetrable by oxygen and which does not substantially interfere with the transfer of light through the media from and to the data retrieval device (e.g., that is substantially transparent at the wavelength of light utilized by the device, and/or which allows a reflectivity from the media of about 50% or greater, with a percent reflectivity of about 65% or greater preferred and a percent reflectivity of about 75% or greater more preferred). Possible UV curable materials include acrylates (e.g., thermal cross-linked acrylates, and the like) silicon hardcoats, and the like, as well as reaction products and combinations comprising at least one of the foregoing materials. Other examples of UV materials are described in U.S. Pat. Nos. 4,179,548 and 4,491,508. Some useful polyfunctional acrylate monomers include, for example, diacrylates of the formulas, collectively designated XI:

(XI)

$$H_2C=\overset{CH_3}{\underset{|}{C}}COO-CH_2-OOC\overset{CH_3}{\underset{|}{C}}=CH_2,$$

$$H_2C=CHCOO-CH_2-CH_2-OOCCH=CH_2,$$

$$H_2C=CHCOO-CH_2-CHOHCH_2-OOCCH=CH_2,$$

$$H_2C-\overset{CH_3}{\underset{|}{C}}CHOO-(CH_2)_6-OOC\overset{CH_3}{\underset{|}{C}}=CH_2,$$

$$HC=CHCOO-CH_2-CH_2-\overset{OOCH=CH_2,}{\underset{|}{CH}}-CH_3$$

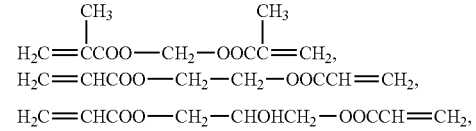

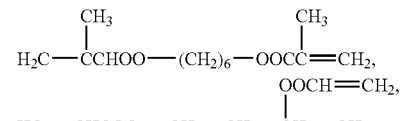

triacrylates of the formulas,

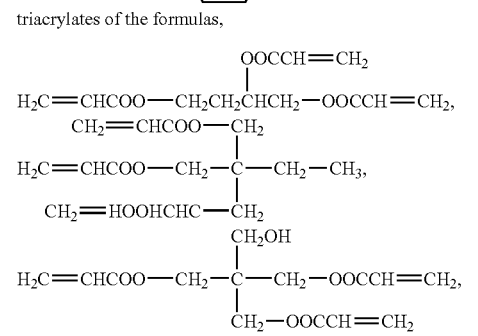

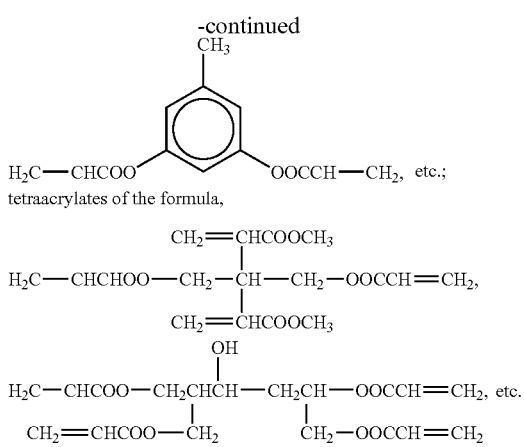

tetraacrylates of the formula,

Although the UV coating may contain only one of said polyfunctional acrylate monomers, or a mixture comprising at least one of the polyfunctional acrylate monomers (and the UV light reaction product thereof), preferred coating compositions contain a mixture of two polyfunctional monomers (and the UV light reaction product thereof), preferably a diacrylate and a triacrylate (and UV light the reaction product thereof), with minor amounts of mono-acrylate used in particular instances. Optionally, the UV coating can comprise nonacrylic UV curable aliphatically unsaturated organic monomers in amounts up to about 50 wt % of the uncured UV coating that includes, for example, such materials as N-vinyl pyrrolidone, styrene, and the like, and reaction products and combinations comprising at least one of the foregoing materials.

When the UV layer comprises a mixture of acrylate monomers, it is preferred that the ratio, by weight, of the diacrylate to the triacrylate be about 10/90 to about 90/10. Exemplary mixtures of diacrylate and triacrylates include mixtures of hexanediol diacrylate with pentaerythritol triacrylate, hexanediol diacrylate with trimethylolpropane triacrylate, diethyleneglycol diacrylate with pentaerythritol triacrylate, and diethyleneglycol diacrylate with trimethylolpropane triacrylate, and the like.

The UV coating can also comprise a photosensitizing amount of photoinitiator, i.e., an amount effective to effect the photocure of the UV coating in a non-oxidizing atmosphere, for example, nitrogen. Generally, this amount comprises about 0.01 wt %, with about 0.1 wt % preferred, to about 10 wt %, with about 5 wt % preferred, based upon the total weight of the UV coating. Possible photoinitiators include blends of ketone-type and hindered amine type materials that form suitable hard coatings upon exposure to UV radiation. It is preferable that the ratio, by weight, of the ketone compound to the hindered amine compound be about 80/20 to about 20/80. Ordinarily, about 50/50 or about 60/40 mixtures are quite satisfactory.

Other possible ketone-type photoinitiators, which preferably are used in a nonoxidizing atmosphere, such as nitrogen, include: benzophenone, and other acetophenones, benzil, benzaldehyde and 0-chlorobenzaldehyde, xanthone, thioxanthone, 2-clorothioxanthone, 9,10-phenanthrenenquinone, 9,10-anthraquinone, methylbenzoin ether, ethylbenzoin ether, isopropyl benzoin ether, α,α-diethoxyacetophenone, α,α-dimethoxyacetophenone, 1-phenyl-1,2-propanediol-2-o-benzoyl oxime, α,α-dimethoxy-α-phenylacetpheone, phosphine oxides, and the like. Further included are reaction products and combinations comprising at least one of the foregoing photoinitiators.

The UV layer may also optionally comprise flatting agents, surface active agents, thixotropic agents, UV light stabilizers, UV absorbers and/or stabilizers such as resorcinol monobenzoate, 2-methyl resorcinol dibenzoate, and the like, as well as combinations reaction products comprising at least one of the foregoing. The stabilizers can be present in an amount, based upon the weight of the uncured UV layer of about 0.1 wt %, preferably about 3 wt %, to about 15 wt %.

Having met the defeatability test, limited-play data storage media with a reactive layer (e.g., poly (methyl methacrylate)/leuco methylene blue basecoat) and a UV cured topcoat were tested for playability. Upon initial exposure to oxygen, the disc was playable. During longer exposure to oxygen, the disc gradually turned blue as the leuco methylene blue was oxidized and ultimately became non-playable. This was surprising since nearly all UV cured acrylic resins are crosslinked materials, and a variety of cross linked materials are known to be barriers to oxygen, and since the protective layer could be UV cured without causing the reactive layer to oxidize prematurely. For example, transparent barrier coatings applied by electron beam evaporation have recently been reviewed (ref: Proceedings, Annual Technical Conference—Society of Vacuum Coaters 1998, Soc. of Vacuum Coaters, Albuquerque, N. Mex., USA. p. 424-428). If oxygen could not diffuse through the UV topcoat to the leuco methylene blue in the reactive layer, oxidation of the leuco methylene blue would not occur to form methylene blue which is required for limited playability, as described above.

Figure 2:
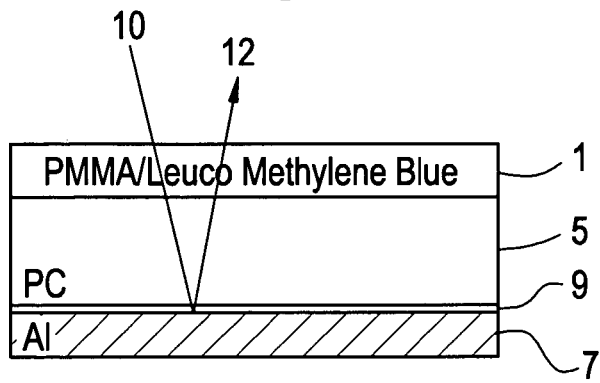
FIG. 2 is a schematic showing incident light, 10, and transmitted light, 12, passing into and being reflected from an aluminum layer in a data storage media coated with PMMA/leuco methylene blue basecoat.

A second benefit of having a UV cured topcoat was discovered, as follows. The rate of oxidation of the leuco methylene blue to methylene blue was determined by measuring the percent reflectivity of coated discs. The percent reflectivity is related to the amount of incident light, arrow 10, that is absorbed in passing through several layers, including a PMMA/leuco methylene blue layer, as shown in FIG. 2. The percent reflectivity is the ratio of transmitted light, arrow 12, to incident light.

Figure 3:
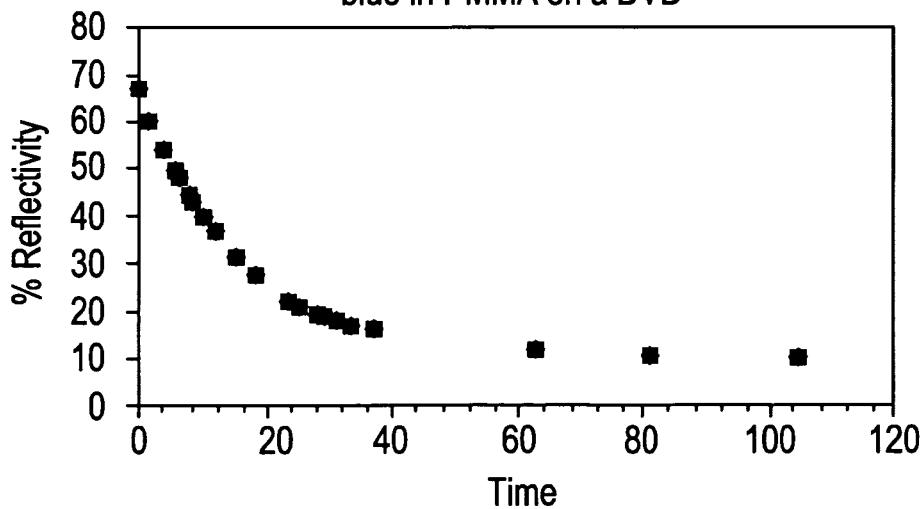
FIG. 3 is a kinetics curve for conversion of leuco methylene blue to methylene blue as measured by percent reflectivity on a data storage media vs. time.

As more methylene blue is formed by oxidation of leuco methylene blue, the amount of light reflected from the aluminum surface in a data storage media is reduced since the methylene blue that is formed absorbs some of the incident and reflected light. A typical kinetics curve result is shown in FIG. 3 for a PMMA/leuco methylene blue coating on a data storage media.

Ideally for a limited-play data storage media, it would be desirable to have no loss of percent reflectivity for a period of time so that the limited-play data storage media would play impeccably in every type of data storage media player Alternatively, having a very high percent reflectivity (e.g., an initial percent reflectivity of about 75% or greater), with a maintained percent reflectivity of about 65% or greater for the desired period of time, meets the most customer requirements. As shown in FIG. 3 above, percent reflectivity falls immediately as leuco methylene blue in PMMA is exposed to air.

Figure 4:
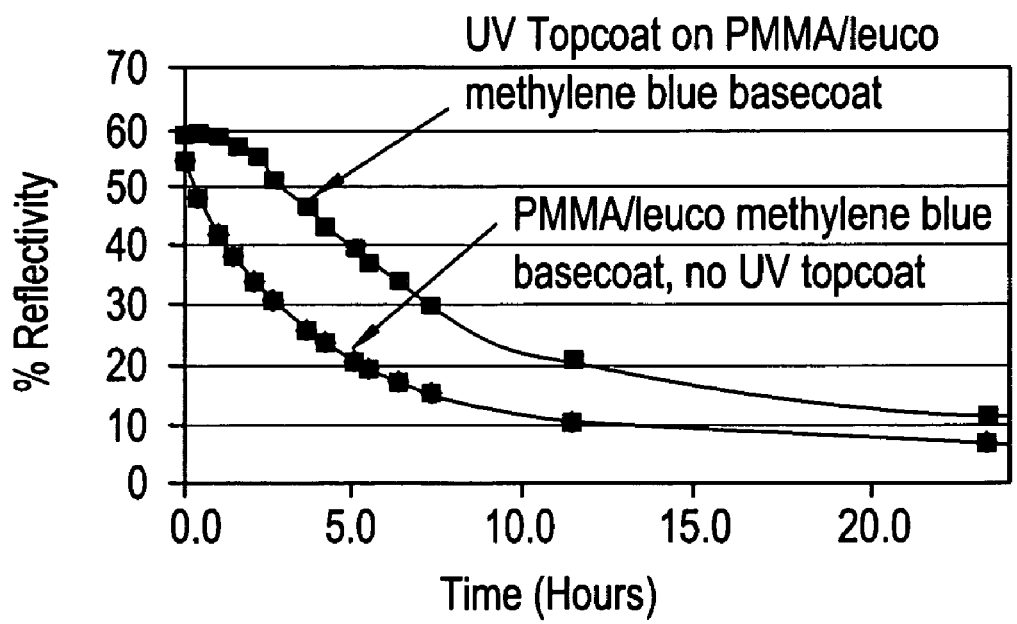
FIG. 4 is a graphical representation of kinetics curves for conversion of leuco methylene blue to methylene blue in PMMA with and without a UV cured topcoat.
Figure 5:
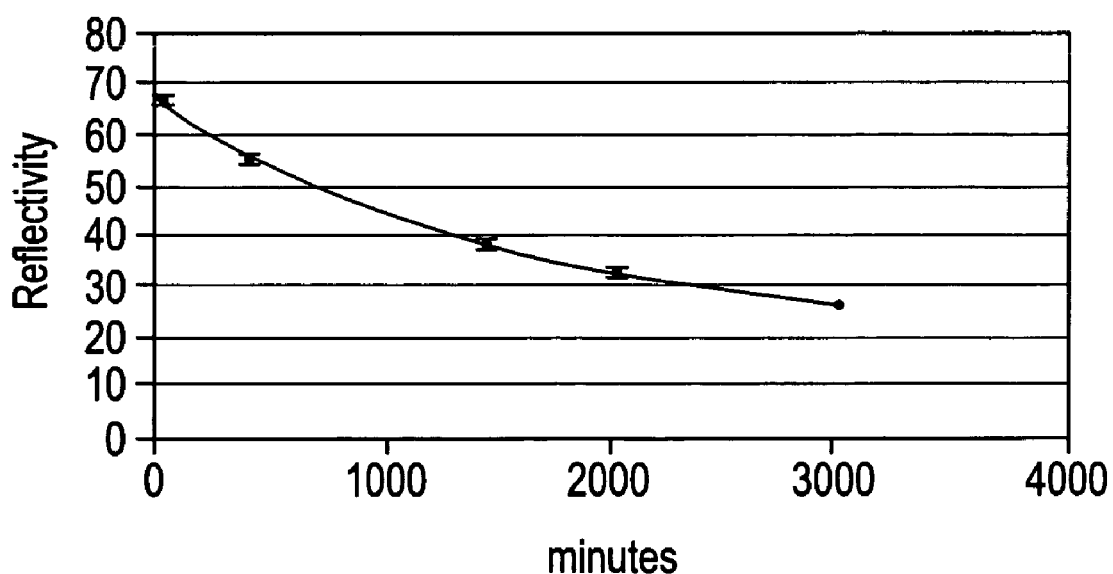
FIG. 5 is a graphical representation of reflectivity vs. time for the Example 3 data storage media.

Surprisingly it has been found that when a UV topcoat is applied to a PMMA/lecuo methylene blue basecoat, the time is extended before the percent reflectivity begins to fall relative to a basecoat that has no topcoat, shown below. Thus high reflectivity is maintained longer so that playability in a data storage media player can be guaranteed for a longer period of time. Specifically, it has been found that some types of data storage media players do not play data storage media when the percent reflectivity is 45% or less. In FIG. 4, it can be seen that when there is no UV topcoat on the PMMA/leuco methylene blue basecoat, the percent reflectivity reaches 45% in about 1 to about 2 hours whereas it takes about 4 to about 8 hours when a UV topcoat is present.

EXAMPLES

Example 1

This example describes preparation of PMMA/leuco methylene blue coating solution.

A solution of PMMA in 1-methoxy-2propanol was prepared by adding 60 grams of Elvacite 2010 poly (methyl methacrylate) from Ineos Acrylics to 300 grams of 1-methoxy-2propanol in a bottle and rolling on a roller mill to effect dissolution. The solution was transferred to a flask and heated to about 80° C. while a slow stream of nitrogen was passed over the surface of the solution. The de-aerated solution was transferred using nitrogen pressure to a de-aerated bottle closed with a rubber septum using a cannula tube.

A leuco methylene blue solution was prepared by combining 1.2 grams of methylene blue trihydrate and 0.80 grams of camphor sulfonic acid with 40 grams of 1-methoxy-2propanol in a 100-mL flask equipped with a rubber septum. The stirred mixture was heated in a 90° C. water bath while a stream of nitrogen was passed into the flask using syringe needles for both the nitrogen inlet and outlet. While hot, 4.2 milliliters (mL) of tin (II) 2-ethylhexanoate was added by syringe to reduce the methylene blue to the dark amber leuco methylene blue. To the solution was added 0.6 mL of polyether modified poly-dimethyl-siloxane.

To make the PMMA/leuco methylene blue coating solution, the leuco methylene blue solution above was drawn into a syringe and then injected into the PMMA solution after having been passed through a 0.2-micron syringe filter.

Example 2

This example illustrates the preparation of a disc with the PMMA//leuco methylene blue layer. Approximately 3 mL of the Example 1 PMMA/leuco methylene blue coating solution was applied as a ring around the inner diameter of a DVD held on a spin coater. After spin coating at 500 rpm for 60 seconds, the coating was tack-free and essentially colorless (e.g., a percent reflectivity of about 65%). The disc was placed a DVD player and was completely playable.

Example 3

The coated disc from Example 2 was allowed to stand at ambient room conditions during which time average percent reflectivity was measured at various times using a Dr. Schenk PROmeteus MT-136E optical disk tester. As the percent reflectivity dropped the color of the disc turned from essentially colorless to blue. After the disc had been in air for about 1 week, it was very blue and would not play in a DVD player; e.g., the disc had a percent reflectivity of about 10%.

Example 4

This example illustrates that the disc described in Examples 2 and 3 is defeatable. The blue disc from Example 3 was placed in a solution of 3 parts by weight of household bleach and 7 parts by weight of water. After standing in this solution overnight, the disc was again colorless (i.e., a percent reflectivity of greater than about 50%) and the coating appeared to have been removed. Another disc prepared in the same fashion as the one in Example 2 was placed in a closed container above a bleach solution. After standing overnight, the blue color in the PMMA coating was gone. Both discs were completely playable in a DVD player.

Example 5

This example illustrates preparation of a PMMA/leuco methylene blue layer and UV coated DVD disc. A solution was prepared as in Example 1 except the following quantitites of raw materials were used. Note: Elvacite 2008 is a low molecular weight version of poly (methyl methacrylate).

| PMMA Solution | grams |
|---|---|
| Dowanol | 579.0 |
| Total Elvacite | 157.5 |
| Elvacite 2008: | 118.1 |
| Elvacite 2010: | 39.4 |
| Dye Solution | |
| methylene blue trihydrate | 8.09 |
| camphorsulfonic acid | 3.02 |
| Dowanol PM | 161.21 |
| stannous octanoate | 18.74 |
| BYK-301 | 1.58 |

The solution was used to apply a PMMA/leuco methylene blue basecoat to a DVD the same as in Example 2 except the discs were spun at 500 rpm for 3 seconds and then at 1,000 rpm for 7 seconds. The average coating thickness was 2.6 microns.

After one of the discs with the PMMA/leuco methylene blue basecoat had been stored overnight in a nitrogen chamber, UV resin, a mixture of acrylates commonly known as Daicure SD-640 (commercially available from DaiNippon, Inc., and Dic Trading, USA, Fort Lee, N.J.) was applied to it in the manner described in Example 2, spun at 1,000 rpm for 3 seconds, and passed under a UV lamp.

The kinetics of oxidation of a disc with just the basecoat and that of another with the UV topcoat on the basecoat were determined in the manner of Example 3. The results are shown in FIG. 4.

Example 6

The two discs from Example 5 were subjected to the bleach tests described in Example 4. The disc with just the basecoat failed the bleach test just like the disc in Example 4. However, the disc with the UV topcoat did not lose its blue color when immersed in bleach or when it was exposed to bleach vapors. In addition, it was not playable in a DVD player. This illustrates that the coated DVD with the UV coating passes the bleach defeatability test.

The use of a UV coating in combination with a reactive material can be used to make a variety of limited-use optical media devices by adjusting the thickness/density of the UV coating, the period of playability of the disc can be adjusted as desired.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

The invention claimed is:

1. A media, comprising:
   a substrate;
   a reflective layer;
   an oxygen penetrable UV cured coating, wherein the UV cured coating further comprises a silicon hardcoat; and
   a reactive layer disposed between said UV cured coating and said reflective layer, wherein said reactive layer comprises a reactive material that oxidizes with exposure to oxygen to a darker color;
   wherein the media is a limited play media.

2. The media as in claim 1, wherein said substrate comprises polycarbonate produced from a bis(hydroxyaryl)cycloalkane.

3. The media as in claim 1, wherein said substrate comprises a thermoplastic having a glass transition temperature of about 100 degrees Celsius or greater.

4. The media as in claim 1, wherein said substrate is selected from the group consisting of polyimides, polyacrylates, and polyphenylene ethers, and mixtures, copolymers, reaction products, and composites comprising at least one of the foregoing thermoplastics.

5. The media as in claim 4, wherein the substrate comprises polyacrylates, and copolymers and combinations comprising at least one of the foregoing.

6. The media as in claim 4, wherein said substrate comprises polyphenylene ethers.

7. The media as in claim 6, wherein the substrate further comprises polystyrene, and copolymers and combinations comprising both polyphenylene ether and polystyrene.

8. The media as in claim 1, wherein the UV cured coating further comprises an acrylate.

9. The media as in claim 1, wherein said reactive material further comprises polymethylmethacrylate/leuco methylene blue.

10. The media as in claim 1, wherein said reactive material is selected from the group consisting of oxygen sensitive leuco methylene blue, reduced forms of methylene blue, brilliant cresyl blue, basic blue 3, toluidine 0, and combinations comprising at least one of the foregoing reactive materials.

11. The media as in claim 10, wherein said reactive layer comprises from about 3 wt % to about 7 wt % of the reactive material, based upon a total weight of said reactive layer.

12. The media as in claim 11, wherein the UV cured coating is disposed on a side of said reflective layer opposite said substrate.

13. The media of claim 12, wherein the UV cured coating is located on a surface of the media.

14. The media as in claim 1, wherein said reactive material is present in the reactive layer in an amount in a range of from about 0.1 wt % to about 10 wt %, based upon a total weight of said reactive layer.

15. The media as in claim 1, further comprising a data storage layer disposed between said reflective layer and said reactive layer, wherein said data storage layer comprises an organic dye.

16. The media as in claim 1, further comprising a data storage layer between disposed between said reflective layer and said reactive layer, wherein said data storage layer comprises inorganic phase change compound.

17. The media as in claim 1, further comprising a data storage layer disposed between said reflective layer and said reactive layer, wherein said data storage layer comprises a material selected from the group consisting of a rare earth element—transition metal alloy, nickel, cobalt, chromium, tantalum, platinum, terbium, gadolinium, iron, boron, and alloys and combinations comprising at least two of the foregoing materials.

18. The media as in claim 1, wherein the substrate comprises a material such that the media is readable in a media device.

19. The media as in claim 1, wherein the UV cured coating is disposed on a side of said reflective layer opposite said substrate.

20. The media of claim 1, wherein the media becomes unplayable after exposure to oxygen.

21. The media of claim 1, wherein the substrate further comprises data in the form of pits and/or grooves.

22. The media of claim 1, wherein the UV cured coating is located on a surface of the media.

23. The media of claim 1, wherein the media is initially playable, and the media, if exposed to oxygen, is playable for a period of no more than about 3 days.

* * * * *